(12) United States Patent
Yoneyama et al.

(10) Patent No.: US 8,890,947 B2
(45) Date of Patent: Nov. 18, 2014

(54) MICROSCOPE APPARATUS AND METHOD FOR IMAGE ACQUISITION OF SPECIMEN SLIDES HAVING SCATTERED SPECIMENS

(75) Inventors: Takashi Yoneyama, Tokyo (JP); Chika Nakajima, Tokyo (JP)

(73) Assignee: Olympus Corporation, Tokyo (JP)

( * ) Notice: Subject to any disclaimer, the term of this patent is extended or adjusted under 35 U.S.C. 154(b) by 592 days.

(21) Appl. No.: 13/160,201

(22) Filed: Jun. 14, 2011

(65) Prior Publication Data

US 2011/0316999 A1    Dec. 29, 2011

(30) Foreign Application Priority Data

Jun. 21, 2010    (JP) ................ 2010-140790

(51) Int. Cl.
*H04N 9/47*     (2006.01)
*H04N 7/18*     (2006.01)
*G02B 21/36*    (2006.01)
*G02B 21/24*    (2006.01)

(52) U.S. Cl.
CPC .............. *H04N 7/183* (2013.01); *G02B 21/367* (2013.01); *G02B 21/241* (2013.01)
USPC .......................................................... 348/79

(58) Field of Classification Search
USPC ................................. 348/79, 207
See application file for complete search history.

(56) References Cited

U.S. PATENT DOCUMENTS

| | | | |
|---|---|---|---|
| 2006/0078217 A1* | 4/2006 | Poon et al. | 382/255 |
| 2007/0206096 A1 | 9/2007 | Cooke et al. | |
| 2010/0253774 A1* | 10/2010 | Yoshioka et al. | 348/79 |

FOREIGN PATENT DOCUMENTS

| | | |
|---|---|---|
| JP | H06003597 | 1/1994 |
| JP | 11-264937 | 9/1999 |
| JP | 2001091846 | 4/2001 |
| JP | 2004108947 | 4/2004 |
| JP | 2007233093 | 9/2007 |
| JP | 2010-140790 | 6/2010 |

* cited by examiner

*Primary Examiner* — Dave Czekaj
*Assistant Examiner* — Leron Beck

(57) ABSTRACT

Provided is a microscope apparatus including a macro-image, acquisition section that acquires a macro image of a glass slide having a specimen mounted thereon; an extraction section that extracts the specimen in the acquired macro image; a block setting section that sets, when the extracted specimen is scattered to form a plurality of lumps, a plurality of blocks that include the lumps of the specimen; an area dividing section that divides an area that includes the specimen in each of the blocks into a plurality of small regions; and a micro-image acquisition section that acquires, for each of the small regions, a micro image while performing an automatic focusing operation for the specimen in the small region, in which the micro-image acquisition section searches for an autofocusing in-focus position in each of the blocks set by the block setting section.

16 Claims, 4 Drawing Sheets

MICROSCOPE APPARATUS AND METHOD FOR IMAGE ACQUISITION OF SPECIMEN SLIDES HAVING SCATTERED SPECIMENS

CROSS-REFERENCE TO RELATED APPLICATIONS

This application is based on Japanese Patent Application No. 2010-140790, the contents of which are incorporated herein by reference.

BACKGROUND OF THE INVENTION

1. Field of the Invention

The present invention relates to a microscope apparatus and an image acquisition method.

2. Description of Related Art

Conventionally known is a microscope that acquires a macro image of a specimen on a glass slide, extracts an area of the specimen in the macro image, divides the area into a plurality of small regions, and acquires high-resolution micro images corresponding to the small regions (see Japanese Unexamined Patent Application, Publication No. 2007-233093, for example) In this microscope, it is possible to connect the acquired micro images to build a so-called virtual slide in which the entire specimen can be observed with high resolution.

Furthermore, in this microscope, when the micro images are acquired while an in-focus position for the specimen on the glass slide is continuously searched for through automatic focusing, the automated focusing range is limited to a fixed range in order to avoid a failure in automatic focusing. When the in-focus position is out of the fixed range, the automatic focusing operation is stopped.

Specifically, when the specimen exists continuously on the glass slide, the in-focus position is gradually changed in the automatic focusing range, and thus, the in-focus state can always be maintained. However, in some cases, the specimen is scattered on the glass slide, forming a plurality of islands. If there is a difference exceeding the automatic focusing range in the height of the specimen between the islands, due to a fluctuation in the thickness of the glass slide, when the micro-image acquisition region is changed from one island to another island, automatic focusing may result in failure, causing the image to be out of focus and blurred.

BRIEF SUMMARY OF THE INVENTION

The present invention provides a microscope apparatus including: a macro-image acquisition section that acquires a macro image of a glass slide having a specimen mounted thereon; an extraction section that extracts the specimen in the macro image of the glass slide, acquired by the macro-image acquisition section; a block setting section that sets, when the specimen extracted by the extraction section is scattered to form a plurality of lumps, a plurality of blocks that include the lumps of the specimen; an area dividing section that divides an area that includes the specimen in each of the blocks set by the block setting section into a plurality of small regions; and a micro-image acquisition section that acquires, for each of the small regions generated by the area dividing section, a micro image having a higher resolution than the macro image while performing an automatic focusing operation for the specimen in the small region, in which the micro-image acquisition section searches for an autofocusing in-focus position in each of the blocks set by the block setting section.

Furthermore, the present invention provides an image acquisition method including: a macro-image acquisition step of acquiring a macro image of a glass slide having a specimen mounted thereon; a specimen extraction step of extracting the specimen in the macro image of the glass slide, acquired in the macro-image acquisition step; a block setting step of setting, if the specimen extracted in the specimen extraction step is scattered to form a plurality of lumps, a plurality of blocks that include the lumps of the specimen; a small-region generation step of dividing an area that includes the specimen in each of the blocks set in the block setting step into a plurality of small regions; an in-focus position searching step of searching for an autofocusing in-focus position in each of the blocks set in the block setting step; and a micro-image acquisition step of acquiring, from any of the small regions in a block where the in-focus position has been found in the in-focus position searching step, a micro image having a higher resolution than the macro image while performing an automatic focusing operation for the specimen in the small region.

DETAILED DESCRIPTION OF THE INVENTION

A microscope apparatus 1 and an image acquisition method according to one embodiment of the present invention will be described below with reference to the drawings.

Figure 1:
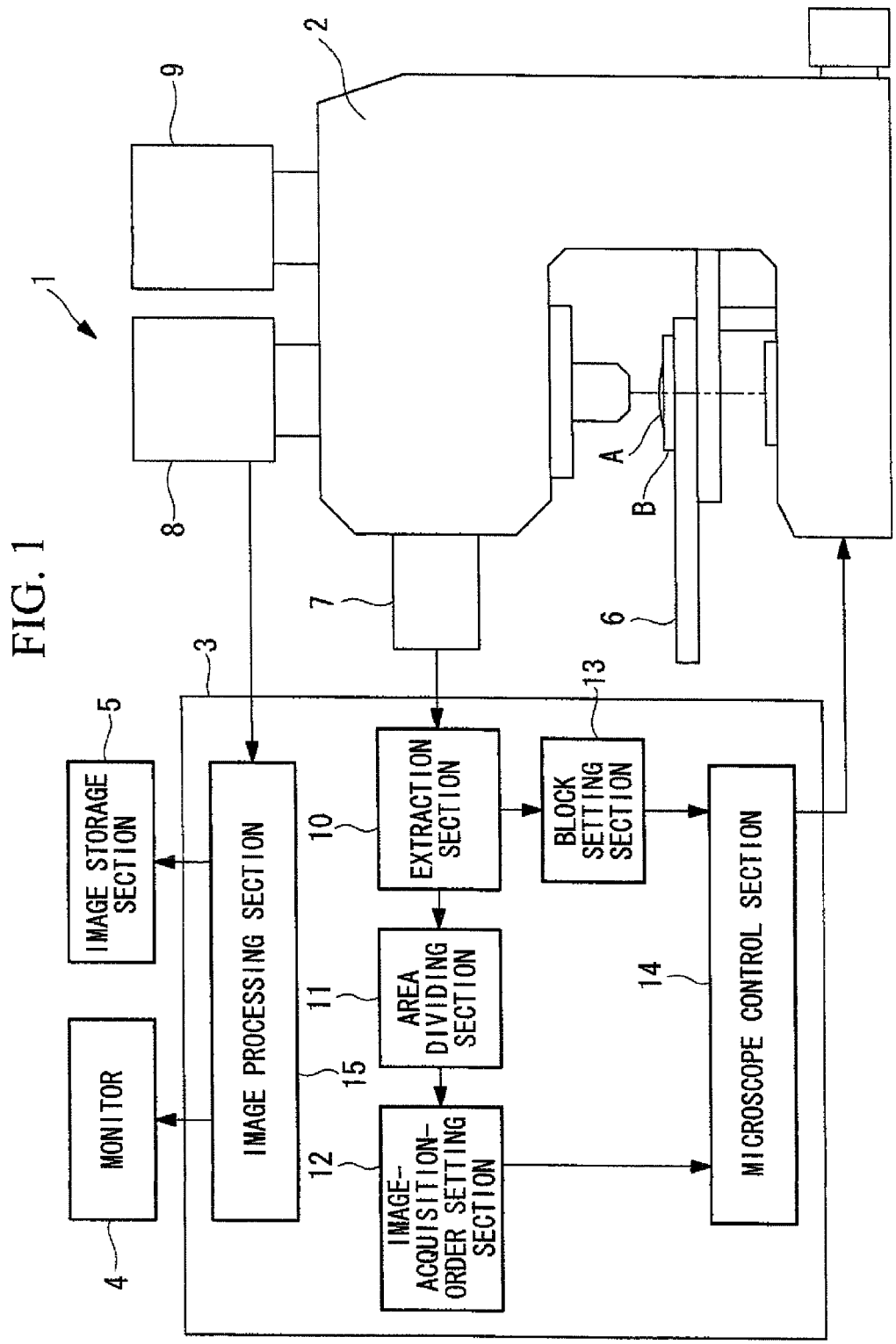
FIG. 1 is a view showing the overall configuration of a microscope apparatus according to one embodiment of the present invention.

As shown in FIG. 1, the microscope apparatus 1 of this embodiment includes a microscope main body 2, a control section 3, a monitor 4 serving as a display section that displays a macro image and a micro image, to be described later, and an image storage section 5.

The microscope main body 2 includes a stage 6 on which a glass slide B having a specimen A mounted thereon is placed and that moves the glass slide B in two horizontal directions that are perpendicular to each other; a macro camera 7 serving as a macro-image acquisition section that acquires a macro image including the entire specimen A mounted above the stage 6; a micro camera 8 serving as a micro-image acquisition section that acquires a partial micro image of the specimen A, the micro image having higher resolution than the macro image; and an automatic focusing device 9 that automatically adjusts the in-focus position for the specimen A.

The automatic focusing device 9 is a so-called real-time automatic focusing device that consecutively detects an in-focus position (that consecutively performs an automatic focusing operation) for the specimen A while moving the stage 6 horizontally.

The automatic focusing device 9 performs an automatic focusing operation if the in-focus position for a small region located on the optical axis of the micro camera 8 is found in a fixed range of movement from the in-focus position for the previous small region, and, if not, keeps the in-focus position for the small region in which the automatic focusing operation was performed immediately before.

The control section 3 is a CPU (central processing unit) and includes an extraction section 10 that processes a macro image acquired by the macro camera 7 to extract the contour shape of the specimen A on the glass slide B and an area dividing section 11 that applies a grid so as to include the contour shape extracted by the extraction section 10 to divide the specimen A into a plurality of small regions. Each small region is set to have the same size as the field of view of the micro camera 8.

Furthermore, the control section 3 includes an image-acquisition-order setting section 12 that sets, for the generated plurality of small regions, the order of micro-image acquisition to be performed by the micro camera 8. For example, as shown by each arrow C in FIG. 2C, the micro images of the plurality of small regions, arranged on a grid-like square array, are sequentially acquired in the order in which the plurality of small regions are scanned so as to draw a continuous line from the upper left corner of the arrangement to the lowest row thereof while alternately meandering to the right and left.

Furthermore, the control section 3 includes a block setting section 13 that determines whether the specimen A extracted by the extraction section 10 is scattered to form a plurality of lumps on the glass slide B and, if the specimen A is scattered, defines a plurality of blocks B1, B2, and B3 that include the lumps of the specimen A. Whether the specimen A is scattered is determined by determining whether the specimen A extracted by the extraction section 10 forms a plurality of separate lumps. In an example shown in FIG. 2, the three blocks 31, 52, and 53 are defined.

Furthermore, the control section 3 includes a microscope control section 14 that obtains information about the blocks B1, B2, and B3 defined by the block setting section 13 (for example, information about the barycentric positions of the lumps of the specimen) and also obtains information about the micro-image acquisition order set by the image-acquisition-order setting section 12, thereby controlling the microscope main body 2.

When the blocks B1, B2, and B3 are defined for the lumps of the scattered specimen A, as described above, the microscope control section 14 instructs the automatic focusing device 9 to search for an autofocusing in-focus position at the barycentric position of the lump of the specimen A in each of the blocks 21, 22, and B3, prior to micro image acquisition.

For the blocks B1, B2, and B3 in each of which the in-focus position has been found, micro images are acquired while the automatic focusing operation is being performed using that in-focus position as a reference. On the other hand, for a block where the in-focus position has not been found, micro images are not acquired, and an autofocusing in-focus position is searched in the next block.

Furthermore, the micro images acquired by the micro camera 8 are processed by an image processing section 15, then stored in the image storage section 5, and displayed on the monitor 4 after they are connected as needed.

The image acquisition method using the thus-configured microscope apparatus 1 according to this embodiment will be described below.

Figure 3:
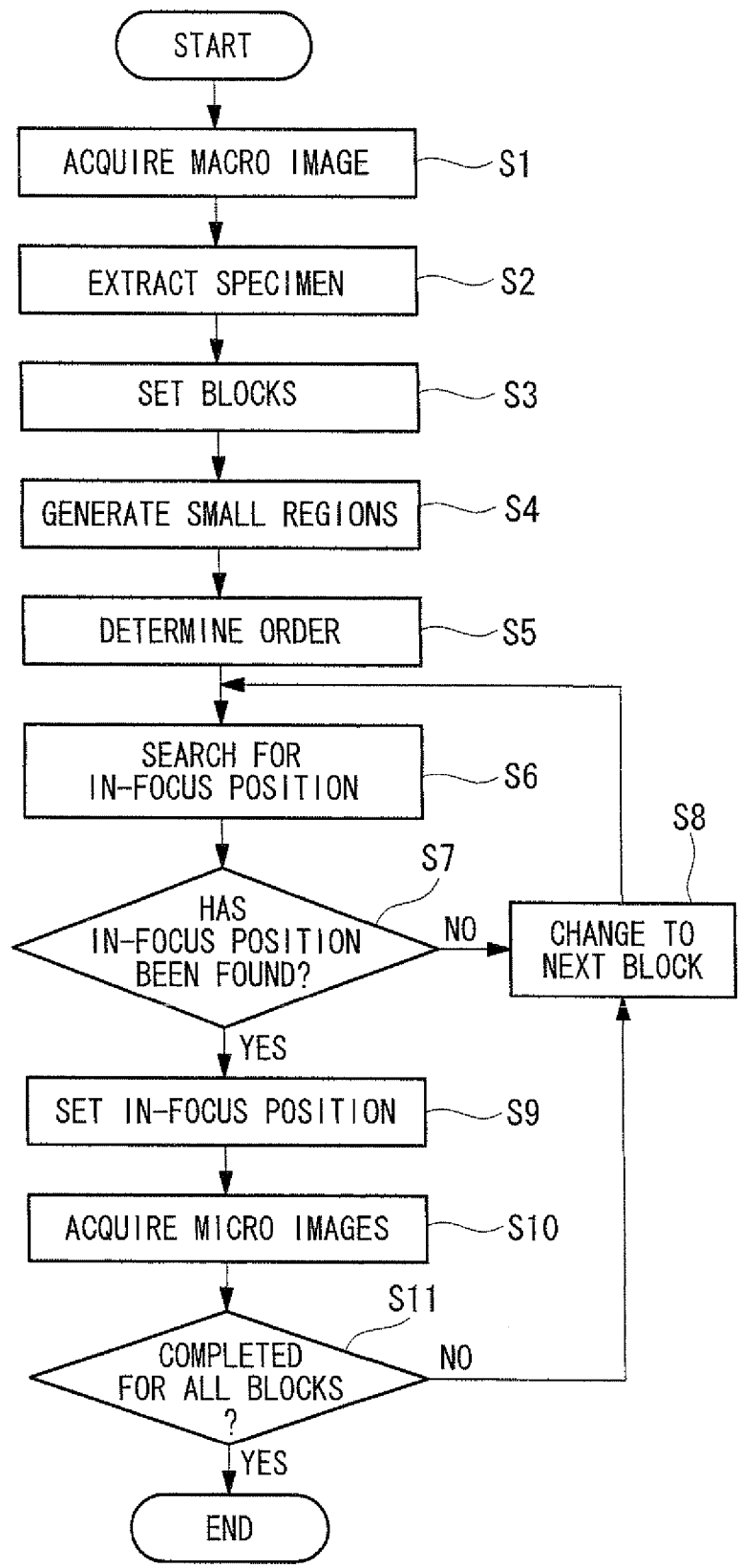
FIG. 3 is a flowchart showing an image acquisition method using the microscope apparatus shown in FIG. 1.

As shown in FIG. 3, the image acquisition method of this embodiment includes a macro-image acquisition step S1 of acquiring a macro image $G_1$ of the glass slide B; a specimen extraction step S2 of extracting the specimen A in the acquired macro image $G_1$ of the glass slide B; a block setting step S3 of defining, if the extracted specimen A is scattered on the glass slide B, the blocks B1, B2, and B3 for the lumps of the specimen A; and a small-region generation step S4 of applying, in each of the blocks B1, B2, and B3, a lattice-like grid G to an area that includes the specimen A to divide the area into a plurality of small regions R.

Figure 2A:
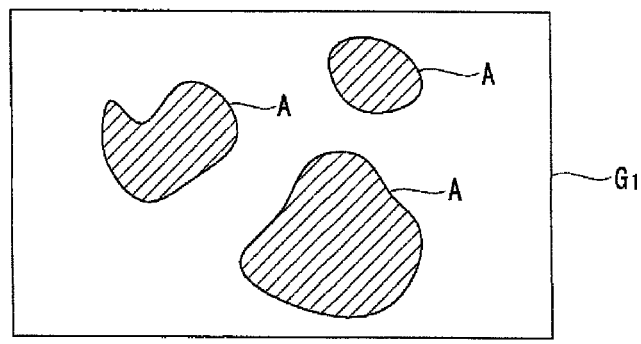
FIG. 2A is a view showing an example macro image acquired by the microscope apparatus shown in FIG. 1.

In the macro-image acquisition step S1, the macro image $G_1$ of the entire specimen A is acquired by the macro camera 7, as shown in FIG. 2A.

In the specimen extraction step S2, the extraction section 10 provided in the control section 3 extracts the contour shape of the specimen A from the macro image $G_1$.

Figure 2B:
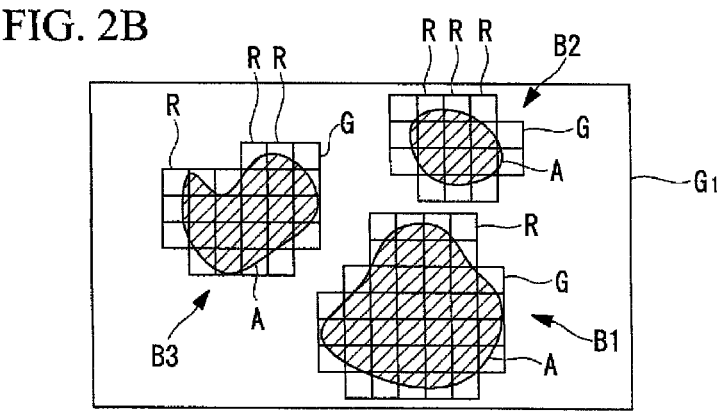
FIG. 2B is a view showing example small regions generated by using grids.

In the small-region generation step S4, as shown in FIG. 2B, the area dividing section 11 provided in the control section 3 applies the grid G to the specimen A so as to include its contour shape, extracted by the extraction section 10, to divide the specimen A into a plurality of small regions R.

Figure 2C:
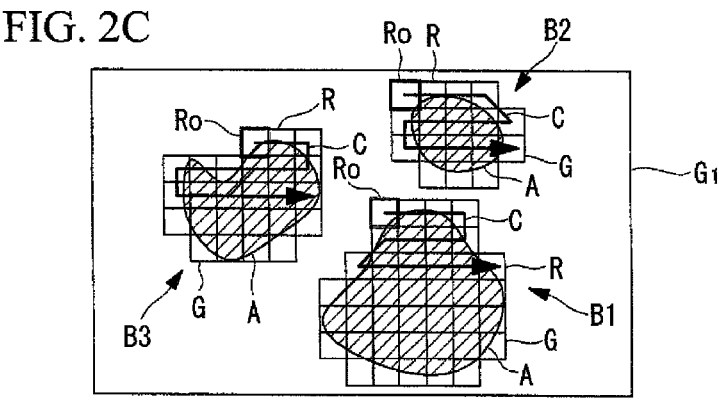
FIG. 2C is a view showing example micro-image acquisition orders.

At this point, the control section 3 determines the order of acquisition of the micro images of the generated plurality of small regions R (order determining step S5). As shown in FIG. 2C, the control section 3 determines the micro-image acquisition order such that the plurality of small regions R, arranged on a square array, are sequentially scanned from an upper-left small region $R_0$ to the lowest row while the scanning line alternately meanders to the right and left. Therefore, micro-image acquisition is started at the small region (acquisition starting small region) $R_0$ that includes the contour of the specimen A such that the specimen A is partially included in the small region R.

Furthermore, the image acquisition method of this embodiment includes an in-focus position searching step S6 of searching for an autofocusing in-focus position in the set block B1, first; an in-focus position setting step S9 of performing, if the in-focus position has been found (YES in Step S7), an automatic focusing operation in the block B1 to set the in-focus position; and a micro-image acquisition step 510 of acquiring, from any of the small regions R, a micro image having a higher resolution than the macro image while performing the automatic focusing operation for the specimen A in this small region R.

The in-focus position searching step S6 is a step of searching, in each of the blocks B1, B2, and B3, for the in-focus position, which is used as a reference for the automatic focusing operation performed to acquire the micro images in the blocks B1, B2, and B3, and this in-focus position search is performed in a range larger than an automatic focusing range that is used in a case where an in-focus position is continuously searched for along the height of the specimen A through the automatic focusing operation at the time of the micro-image acquisition in the blocks B1, B2, and B3. The in-focus position searching step S6 is performed by aligning the optical axis of the micro camera 8 with a small region mainly containing the specimen A, for example, a small region R that is located close to the barycenter of each of the blocks B1, B2, and B3. Note that the in-focus position searching step S6 may be performed by aligning the optical axis of the micro camera 8 with a center portion of a small region R that includes the barycenter of each of the blocks B1, B2, and B3.

In the micro-image acquisition step S10, the microscope control section 14 provided in the control section 3 activates the stage 6 to place the center portion of the acquisition starting small region $R_0$, determined in the order determining step S5, on the optical axis of the micro camera 8. Then, the automatic focusing operation of the automatic focusing device 9 is performed from the in-focus position set in the in-focus position setting step S9, and the micro-image acquisition is performed by the micro camera 8. In the micro-image acquisition step S10, these operations are repeated for all small regions R in the order determined in the order determining step S5.

Here, the automatic focusing operation of the automatic focusing device 9 is performed also when a state in which the center portion of the small region R searched for the in-focus position in the in-focus position searching step S6 is located on the optical axis of the micro camera 8 is changed to a state in which the center portion of the acquisition starting small region $R_0$ is located on the optical axis of the micro camera 8.

Therefore, if the specimen A disappears from the optical axis of the micro camera 8 before the center portion of the acquisition starting small region $R_0$ is located on the optical axis of the micro camera 8, the microscope control section 14 performs control so as to keep the in-focus position found immediately before an in-focus position cannot be detected in the specimen A, that is, the in-focus position found immediately before the specimen A disappears from the optical axis of the micro camera 8.

Then, the micro camera 8 acquires a first micro image when the center portion of the acquisition starting small region $R_0$ is located on the optical axis of the micro camera 8.

After that, the automatic focusing operation of the automatic focusing device 9 is performed also when a state in which the center portion of the acquisition starting small region $R_0$ is located on the optical axis of the micro camera 8 is changed to a state in which the center portion of a small region R adjacent to the acquisition starting small region $R_0$ is located on the optical axis of the micro camera 8.

Then, the micro camera 8 acquires a next micro image when the center portion of the small region R adjacent to the acquisition starting small region $R_0$ is located on the optical axis of the micro camera 8.

On the other hand, if the in-focus position has not been found in the in-focus position searching step S6 (No in Step S7), micro-image acquisition is not performed in this block B1, the target block is changed to the next block B2 (Step S8), and the flow returns to the in-focus position searching step S6.

Then, Steps S6 to S10 are repeated until the processing is completed for all of the blocks B1, B2, and 53 (Step S11).

According to the thus-configured microscope apparatus 1 and image acquisition method of this embodiment, prior to acquisition of the micro image in the acquisition starting small region $R_0$, if the specimen A is scattered on the glass slide B, the blocks B1, B2, and B3 are defined for the lumps of the specimen A in the block setting step S3, and the in-focus position searching step S6 is performed in each of the blocks B1, B2, and B3 to search for an in-focus position; therefore, there is an advantage that, even if there is a difference in the height of the specimen A among the blocks B1, B2, and B3, it is possible to more reliably acquire sharp micro images of the small regions R of the specimen A without the automatic focusing operation failing.

Specifically, in the in-focus position searching step S6, since the in-focus position search is performed by expanding the automatic focusing range Used at the time of the micro-image acquisition, even if there is a difference in the height of the specimen A among the blocks B1, B2, and B3, the in-focus position can be found more reliably. At the time of acquisition of the micro image of each small region R, after the automatic focusing range is returned to the normal narrow range, the automatic focusing operation is performed using the thus-found in-focus position as a reference. Thus, even if there is a difference in the height of the specimen A among the blocks B1, B2, and B3, the automatic focusing operation can be prevented from failing at the time of the micro-image acquisition in each of the blocks B1, B2, and B3.

Figure 4:
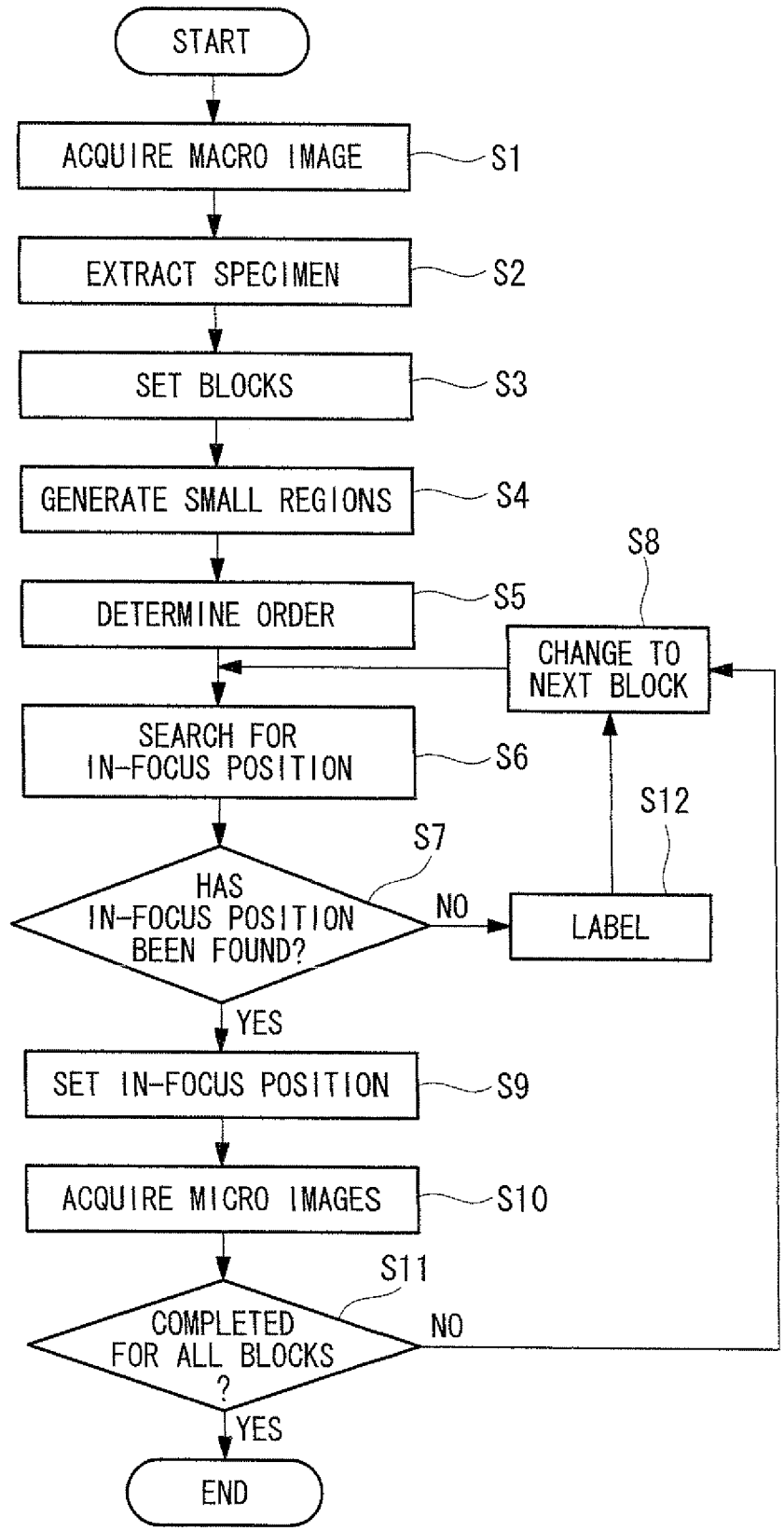
FIG. 4 is a flowchart showing a modification of the image acquisition method shown in FIG. 3.

Note that, in this embodiment, for a block where the in-focus position has not been found in the in-focus position searching step S6, micro-image acquisition is not performed, and processing for the next block starts; however, instead, a block where the in-focus position has not been found may be labeled by the image processing section 15 (Step S12) before processing for the next block starts, as shown in FIG. 4.

Specifically, the micro-image acquisition section need not perform micro-image acquisition in a block where the in-focus position cannot be found through the in-focus position search in each block. The in-focus position cannot be found through the in-focus position search in a case, for example, where there is no contrast difference, as in a character written with oil-based ink on a glass slide, and it is possible to prevent the occurrence of an undesirable situation in which a micro image is acquired even in such a case. Furthermore, for a block where the in-focus position has not been found, thus not allowing a micro image to be acquired, it is possible to recognize this later with a label applied to the macro image. Labeling can be performed by surrounding the corresponding block with a line in the macro image displayed on the monitor 4 or by giving a distinct color to an area where the corresponding block exists.

This affords an advantage that, after micro-image acquisition, it is possible to recognize, just by looking (visually more easily), that micro images were not acquired for a labeled area displayed on the monitor 4 because the in-focus. position was not found through the in-focus position search.

Furthermore, in the above-described embodiment, the macro camera 7 for acquiring the macro image and the micro camera 8 for acquiring the micro image are separately provided; however, a single camera may acquire both the macro image and the micro image.

What is claimed is:

1. A microscope image acquisition apparatus comprising:
a macro-image acquisition section that acquires a macro image of a glass slide having a specimen mounted thereon;
an extraction section that extracts the image of the specimen acquired by the macro-image acquisition section;
a block setting section that sets a respective block for each one of a plurality of non-contiguous specimen elements (lumps) in the extracted specimen image when the specimen extracted by the extraction section is scattered to form said plurality of non-contiguous specimen elements (lumps);
an area dividing section that for each of the blocks set by the block setting section, divides said block into a plurality of small regions; and
a micro-image acquisition section that searches for an autofocusing in-focus position in each of the blocks set by the block setting section, performs an automatic focusing operation for the specimen in each of the small regions in a block where the in-focus position has been found, and acquires, for each of the small regions generated by the area dividing section, a micro image having a higher resolution than the macro image.

2. A microscope image acquisition apparatus according to claim 1, wherein the micro-image acquisition section does not perform micro-image acquisition for a block where the in-focus position has not been found as a result of the in-focus position search in each of the blocks.

3. A microscope image acquisition apparatus according to claim 2, further comprising an image processing section that labels, on the macro image, the block where the in-focus position has not been found as a result of the in-focus position search in each of the blocks, performed by the micro-image acquisition section.

4. A microscope image acquisition apparatus according to claim 3, wherein the image processing section labels the block where the in-focus position has not been found, by coloring the block.

5. A microscope image acquisition apparatus according to claim 1, further comprising an order setting section that sets an order in which the micro-image acquisition section acquires micro images of the plurality of small regions generated by the area dividing section.

6. A microscope image acquisition apparatus according to claim 5, wherein the order setting section sets the order so as to scan the plurality of small regions, arrayed in a grid pattern, from the upper-left small region while the scanning line alternately meanders to the right and left.

7. A microscope image acquisition method comprising:
acquiring using a microscope a macro image of a glass slide having a specimen mounted thereon;
processing the acquired macro image to extract the image of the specimen;
when the specimen extracted in the processing step is scattered to form a plurality of non-contiguous specimen elements (lumps), setting a respective block for each one of said plurality of non-contiguous specimen elements;
for each of the image blocks set in the block setting step, dividing said block into a plurality of small image regions;
searching for an autofocusing in-focus position in each of the image blocks set in the block setting step;
performing an automatic focusing operation for the specimen in each of the small regions where the in-focus position has been found in the in-focus position searching step, and
acquiring, for each of the small regions generated by the dividing step, a micro image having a higher resolution than the macro image.

8. A microscope image acquisition method according to claim 7, wherein, for a block where the in-focus position has not been found as a result of the in-focus position search in each of the blocks, the micro image acquisition is not performed in the micro-image acquisition step.

9. A microscope image acquisition method according to claim 8, further comprising the step of labeling, on the macro image, the block where the in-focus position has not been found as a result of the in-focus position search in each of the blocks, performed by the micro-image acquisition step.

10. A microscope image acquisition method according to claim 9, wherein, in the labeling step, the block where the in-focus position has not been found is labeled by coloring the block.

11. A microscope image acquisition method according to claim 7, further comprising a step of setting an order in which micro images of the plurality of small regions generated in the dividing step are acquired in the micro-image acquisition step.

12. A microscope image acquisition method according to claim 11, wherein, in the order setting step, the order is set so as to scan the plurality of small regions, arrayed in a grid pattern, from the upper-left small region while the scanning line alternately meanders to the right and left.

13. A microscope image acquisition apparatus according to claim 1, wherein the micro-image acquisition section searches a reference of the in-focus position in each of the blocks and starts acquisition of the micro image in each of the blocks on a basis of the reference in each of the blocks.

14. A microscope image acquisition apparatus according to claim 1, wherein an automatic focusing range used in a case where the micro-image acquisition section searches the in-focus position in each of the blocks is larger than an automatic focusing range used in a case where the micro-image acquisition section acquires the micro image in the small region.

15. A microscope image acquisition method according to claim 7, wherein in the in-focus position searching step, a reference of the in-focus position is searched in each of the blocks, and
wherein in the micro-image acquisition step, acquisition of the micro image in each of the blocks is started on a basis of the reference in each of the blocks.

16. A microscope image acquisition method according to claim 7, wherein in the in-focus position searching step, an automatic focusing range used in a case where the in-focus position is searched in each of the blocks is larger than an automatic focusing range used in a case where the micro image in the small region is acquired in the micro-image acquisition step.

* * * * *